3,352,939
OLEFIN ISOMERIZATION PROCESS
Walter E. Breckoff, Royal Oak, and John M. McEuen, Detroit, Mich., assignors to Ethyl Corporation, New York, N.Y., a corporation of Virginia
No Drawing. Filed Feb. 1, 1965, Ser. No. 429,655
16 Claims. (Cl. 260—683.2)

ABSTRACT OF THE DISCLOSURE

An improved process for isomerizing α-olefins to internal olefins which comprises using a Group VIII metal on an inert support as a catalyst, and an aldehyde as a promoter. Suitable catalysts are palladium, platinum, rhodium, iridium or ruthenium and mixtures thereof on finely divided charcoal. Paraffinic aldehydes having up to about 12 carbon atoms are examples of useful promoters.

---

This invention relates to olefin isomerization and more particularly, to the isomerization of straight-chain terminal olefins to straight-chain internal olefins with a catalyst containing a Group VIII metal of the second or third long period of the Periodic Table, or a mixture of such metals.

Various processes for isomerizing terminal olefins to internal olefins are known in the art. However, in general, the prior art processes suffer from one or more limitations such as excessive olefin cracking, undesirable olefin polymerization, excessive randomization, or unfavorable economics. It is known that palladium and platinum halides in combination with other ingredients can be employed as isomerization catalysts. U.S. Patent 2,960,550, Nov. 15, 1960, teaches the isomerization of olefins with a catalytic medium consisting essentially of a halogenated, straight-chain, organic acid solution of a halogen-containing salt of palladium or platinum. U.S. 2,960,551, Nov. 15, 1960, teaches similar catalytic media which consist essentially of a phosphorus oxychloride solution of a halogen-containing palladium or platinum salt. In contrast, this invention comprises the discovery that halide salts of palladium and platinum are unnecessary, and that the isomerization of terminal olefins to internal olefins can take place in the presence of a mixture of Group VIII metals in elemental form. Furthermore, this invention comprises the discovery that halogenated reaction media such as halogenated straight-chain organic acids or phosphorus oxychloride are unnecessary in the isomerization of terminal olefins.

An object of this invention is to provide a process for the isomerization of terminal olefins to internal olefins. A more particular object is to provide a process for the isomerization of straight-chain terminal olefins to straight-chain internal olefins which employs a mixture of Group VIII metals as a catalyst. A further object is to provide an isomerization process which does not entail the use of a halogenated straight-chain organic acid or phosphorus oxychloride as an integral part of a catalytic system. Additional objects will be apparent from the following detailed description and appended claims.

The objects of this invention are satisfied by a process for the isomerization of an olefin which comprises contacting an olefin with a catalytic quantity of a Group VIII metal of the second or third long period of the Periodic Table or a mixture of such metals supported on an inert matrix and a promoter quantity of an aldehyde having up to 12 carbon atoms and being solely composed of carbon, hydrogen, and oxygen. In a preferred embodiment, a straight-chain terminal olefin having from 4 to 24 carbon atoms is isomerized to a straight-chain internal olefin by contacting said olefin with a catalytic quantity of a catalyst consisting of a Group VIII metal selected from the group consisting of palladium, platinum, rhodium, iridium, ruthenium, and metal mixtures of ruthenium-platinum, ruthenium-palladium, rhodium-palladium, rhodium-ruthenium, and rhodium-ruthenium-palladium, said metal or metal mixtures being dispersed on an inert support such as charcoal, and a promoter quantity of unbranched acyclic paraffinic aldehyde having from 6 to 10 carbon atoms. The metal mixtures mentioned above are highly preferred because they are synergistic.

In the process of this invention, unexpected advantages are realized. The aldehyde employed (together with one or more single metal or mixed metal catalysts) unexpectedly acts as a promoter. Thus, when the above-mentioned metal catalysts are employed with an aldehyde in an olefin isomerization process, the time required to attain the same amount of isomerization is decreased by a factor of from 20 to about 130 or more. Furthermore, since the aldehyde promoter enhances the activity of the metal catalyst, the amount of the catalyst required per unit volume of the olefin may be decreased, as also may be decreased the temperature at which the isomerization is accomplished. Another striking effect of the aldehyde is the fact that it greatly prolongs the activity of the metal catalysts; thus, the catalysts may be used for more isomerization reactions than would be possible if the metals were employed alone. Moreover, if at first a metal catalyst is used alone in the isomerization of olefins and its activity is eventually lost, mere addition of a promoter quantity of an aldehyde to the reaction mixture containing the spent catalyst will immediately restore its activity, often to a higher degree than it originally possessed. This unexpected and striking promoter activity of an aldehyde is of economic value because the cost of the process of olefin isomerization may now be decreased manyfold.

The process of this invention is advantageously employed in the conversion of straight-chain terminal olefins having from 12 to about 24 carbon atoms to the corresponding straight-chain internal olefins. However, the process can be employed to isomerize lower olefins such as butene-1, pentene-1, heptene-1, octene-1, nonene-1, and the like. A particular feature of this invention is the high yield of β-olefin afforded by the process.

The reaction temperature is not critical, and conversions may be carried out at ambient temperatures or higher. However, in some instances the isomerization rate is too slow for practical use when the process is carried out at a temperature below about 50° C. Thus, the process is generally carried out at least at 100° C. and preferably at temperatures between about 125° C. and the decomposition temperature of the terminal olefin. A highly preferred reaction temperature is from about 125° to about 225° C. Higher temperatures, however, may also be employed with satisfactory results. Thus, higher olefins, such as dodecene-1, tetradecene-1, and hexadecene-1, may be isomerized at the reflux temperature of the system or up to 275° C.

Atmospheric pressure, or higher or lower pressures, can be employed. Atmospheric pressure is especially useful in the isomerization of olefins having from 12 to about 24 carbon atoms. In general, a preferred pressure range is from about 1 to about 20 atmospheres; a most preferred range being from 1 to about 5 atmospheres.

The reaction time is not a truly independent variable but is dependent at least to some extent on the other process conditions employed. In general, higher temperatures usually result in a decrease of reaction time. The reaction time is governed at least to some extent by the degree of isomerization desired. Furthermore, the reaction time depends on the amount of the catalyst used for a given volume of an olefin and on the specific metal catalyst mixture employed since some mixtures are more active than others. When carrying out the process as a batch operation, reaction times of from about 10 minutes to about 20 hours are usually sufficient.

In general, any aldehyde having up to 12 carbon atoms or more may be employed as the catalyst promoter in the process of this invention. Thus, the aldehydes may contain functional groups in addition to the aldehydic carbonyl group, as for example halogens, hydroxyl groups, and ethers, such as chloroacetaldehyde, chloral, 3-hydroxybutanol, ethoxyacetaldehyde, and the like. It is preferred that the aldehyde be free of any functional groups that react with the carboxyl group and those that complex with the metal catalysts, because they have a detrimental effect on the catalytic activity.

Another preferred group of aldehydes that may be used as promoters in this process is unsubstituted aromatic aldehydes such as benzaldehyde, α-naphthaldehyde, β-naphthaldehyde, o-toluylaldehyde, m-methylbenzaldehyde, 4-methylbenzaldehyde, and the like, and substituted aromatic aldehydes such as 2-hydroxybenzaldehyde, 4-hydroxybenzaldehyde, o-chlorobenzaldehyde, m-chlorobenzaldehyde, p-benzaldehyde, chlorosalicylaldehyde, and the like. It is preferred, however, as stated above, that no substituents that either react with the carbonyl group or complex with the metal catalysts be present.

Still another preferred group of aldehydes is ethylenically unsaturated aliphatic aldehydes such as crotonaldehyde, acrylaldehyde, 2-methyl-2-butenal (α,β-dimethylacrolein) and the like.

A more preferred group of aldehydes that may be employed in the process of this invention as catalyst promoters is paraffinic aldehydes having up to about 12 carbon atoms such as formaldehyde, acetaldehyde, propionaldehyde, butyraldehyde, isobutylaldehyde, pentaldehyde, isopentaldehyde, caproic aldehyde, heptaldehyde, caprylic aldehyde, nonaldehyde, capric aldehyde, undylic aldehyde, lauric aldehyde, cyclohexanecarboxaldehyde, cyclopentanecarboxaldehyde, cyclobutanecarboxaldehyde, and all possible isomers thereof. The above listed paraffinic aldehydes having functional groups in addition to the aldehydic carbonyl groups also comprise a preferred group of promoters, except those groups which are detrimental to the catalytic activity as mentioned above.

The most preferred group of aldehydes as catalyst promoter is the acyclic paraffinic aldehydes having 6 to 10 carbon atoms such as caproic aldehyde, heptaldehyde, caprylic aldehyde, nonaldehyde, capric aldehyde, and isomers thereof. The most highly preferred aldehyde is n-heptaldehyde.

As mentioned above, single metals or mixtures of two or more metals, preferably in a finely divided state supported on an inert matrix, are employed as a catalyst in the process of this invention. Preferably, the supports are in finely divided form or in small states of aggregation such as pellets or tablets having a surface of sufficient area to give an effective catalytic surface. Any inert catalytic support known in the catalytic art can be employed. Preferably, the support is selected from the class consisting of charcoal, alumina, diatomaceous earth, bentonite, firebrick, kaolin, ground glass, silicon carbide, silicon dioxide, kieselguhr, and zeolites. The zeolites are a group hydrated aluminum and calcium or sodium silicates capable of reaction in solution by double decomposition with salts of the alkali and alkaline earth metals. They are of the general type $Na_2O \cdot 2Al_2O_3 — 5SiO_2$ and $$CaO \cdot 2Al_2O_3 5SiO_2$$

Analcine [$NaAlSi_2O_6(H_2O)$]
Chabazite [$ClAl_2Si_4O_{12}(H_2O)_6$]
Heulandite [$CaAl_2Si_6O_{16}(H_2O)_5$]
Natrolite [$Na_2Al_2Si_3O_{10}(H_2O)_2$]
Stilbite [$CaAl_2Si_6O_{16}(H_2O)_6$]
Thomsonite [$(Ca,Na_2)Al_2Si_2O_8(H_2O)_2$]

Charcoal, and particularly finely divided charcoal, is the most highly preferred inert support.

The catalyst preferably consists of from one to about 10 weight percent of finely divided metal dispersed on an inert support of about 90 to about 99 weight percent. It should be noted that both the metals and the inert supports can be in other states of aggregation such as pellets or tablets; but finely subdivided material is preferred because it provides larger surface area and thus increases the efficiency of the catalyst. When a catalyst is too active, however, it might be preferable to employ the metals and/or the inert material that is in larger particle size.

The amount of catalyst employed in this process is not critical. However, it is preferred that an amount of catalyst be used which affords a reasonable amount of isomerization in a reasonable reaction time. In general, when the process of this invention is carried out as a batch operation, from about 0.01 to about 40 weight percent of a catalyst consisting of a metal mixture and an inert support is employed. A preferred range is from about one to about 15 weight percent. Thus, for example, if 100 grams of olefin is charged to the reaction vessel, it is highly preferred that from about one to about 15 grams of a catalyst mixture, that is, a mixture of the metals and the inert support, be admixed therewith.

The amount of the aldehyde as a catalyst promoter employed in the process of this invention is also not critical, but generally it should be within the range of from about 0.05 mole percent to about 50 mole percent of the olefin. The more preferred amount of the aldehyde is within the range of from about 0.1 mole percent to about 10 mole percent of the olefin. It should be understood, however, that smaller or larger amounts of an aldehyde may be successfully employed in this process.

The process of this invention can be carried out as a batch process or as a continuous operation. In a continuous process, an olefin, either in vapor or in liquid phase, may be contacted with the catalyst and promoter, but for practical reasons, liquid phase operations are preferred. When carrying out the process of this invention as a batch operation, it is preferred that a liquid phase be present. Thus, dodecene-1 can be isomerized by refluxing a mixture of dodecene-1 promoter and catalyst at atmospheric pressure. Similarly, butene-1 can be isomerized in a batch operation by contacting it with a promoter and a catalyst at a pressure under which the terminal olefin is a liquid. Alternatively, butene-1 (or any terminal olefin that is gaseous at the reaction temperature) can be isomerized according to the process of this invention by bubbling the gaseous olefin through a liquid reaction medium containing the promoter in contact with the catalyst.

Although this process can be conducted in the presence of a solvent, we prefer not to employ a solvent when isomerizing an alpha olefin which is in the liquid state under the reaction conditions employed.

Those solvents which may be employed should be inert under the reaction conditions. Non-aqueous material such as the saturated hydrocarbons, e.g., pentane, hexane, isopentane, dodecane, and the like are preferred, but ethers, and halogenated hydrocarbons may also be used.

The processes of this invention may be carried out either in air or in an inert atmosphere. When an inert atmosphere is desired, nitrogen is preferred, mainly for economical reasons. However, other inert gases such as neon and argon may be used with equal success. When this invention is carried out as a continuous process, an inert gas, preferably nitrogen, is advantageously used as a carrier for the olefin and promoter that is being passed through the catalyst bed. In such a process, the amount of nitrogen used is measured by cubic centimeters (cc.), passed through the reaction tube per minute. It is preferred that the nitrogen flow be such that the ratio of the volume of nitrogen to the volume of olefin be from 1:1 to 1000:1.

In a continuous process, occasionally a single pass of an olefin through the reaction column might not yield the desired degree of isomerization. In such cases, the partially isomerized olefin may be recycled in the same manner as the fresh olefin through the reaction column to produce the desired degree of isomerization.

To appreciate the unexpectedly great advantage of the aldehyde promoter in the olefin, isomerization process of this invention, one need only compare the experimental conditions of identical isomerization reactions with the exception that in one example an aldehyde promoter is employed and in another it is not employed. Thus, in Table I below are given two metal catalysts, a single metal and a mixed metal catalyst, and the results are compared when these metal catalysts are used in isomerizing dodecene-1 to dodecene-2 both in the presence and in the absence of an aldehyde promoter. The aldehyde is n-heptanal and it is used in the amount of one mole percent of the olefin.

TABLE 1.—ISOMERIZATION OF DODECENE-1 TO DODECENE-2

| Catalyst | Weight Percent Catalyst | Temp. | Time | Yield, Percent |
|---|---|---|---|---|
| 10% Pd/C—No aldehyde | 10 | Reflux | 5.5 hrs | 81 |
| 10% Pd/C—n-heptanal | 10 | do | 0.25 hr | 62 |
| 1% Ru/C:9% Pd/C—No aldehyde | 10 | do | 11.0 hrs | 86 |
| 1% Ru/C:9% Pd/C—n-heptanal | 10 | do | 5 min | 68 |

In the above table all metal on charcoal catalysts are 5 percent by weight of metal. The above table quite clearly demonstrates that the results are startling when only one mole percent of n-heptanal is used. Thus, when the single metal catalyst was used together with n-heptanal as a promoter, the reaction time was decreased by a factor of about 20 without a substantial decrease in yield. In the case of the mixed metal catalyst with n-heptanal, the reaction time was decreased by a factor of over 130 while obtaining substantially the same yield of dodecene-2. Comparison similar to the above holds true when other metal catalysts and other aldehydes are employed, particularly acyclic paraffinic aldehydes having 6 to 10 carbon atoms.

The products of this invention can be separated from the reaction mixture by any method known in the art. Suitable separation techniques include filtration, distillation, decantation, chromatography, and the like.

The following examples serve to illustrate this invention, but do not limit it. All parts are by weight unless otherwise indicated.

*Example 1*

A flask equipped with a side arm fitted with a diaphragm was charged with 18 parts of dodecene-1 and 2 parts of a catalyst consisting of 9 weight percent of 5% palladium on charcoal and one weight percent of 5% ruthenium on charcoal. The flask was swept with nitrogen, one mole percent of n-heptanal was added to the reaction mixture, and the contents of the flask were heated to reflux for 5 minutes while stirring. The reaction mixture was then filtered to remove the catalyst and the isomerized olefin was determined by infrared and vapor phase chromatography analysis to contain 68% dodecene-2. The yield is based on the amount of reacted olefin.

When this example was repeated in the absence of n-heptanal, it was necessary to reflux the reaction mixture for 11 hours to attain substantially the same degree of isomerization and substantially the same yield.

*Example 2*

The procedure of Example 1 was repeated using the same amount of n-heptanal except that 10 weight percent of 5% palladium on charcoal was used as the metal catalyst and the reaction mixture was refluxed for 15 minutes. The yield of dodecene-2 was found to be 62%.

When this reaction was carried out in the absence of n-heptanal, the reflux time required to obtain the same degree of isomerization and substantially the same yield was 5.5 hours.

This example was repeated following the same procedure and using the same amount of n-heptanal, but replacing palladium with 10 weight percent of 5% iridium on charcoal. Substantially the same results as with palladium were obtained.

Examples 3–27 are contained in Table 2 and in all of these examples, the procedure described in Example 1 was followed changing the temperature and the reaction time as indicated in the table.

In the following table, all metal on charcoal catalysts are 5 percent by weight of metal. The weight percentages in column 3 are based on the total weight of the reaction mixture. In Examples 3 to 22 wherein mixed metal catalysts are employed, the weight percentages in column 3 show the relative amounts of each metal/charcoal component used in making up the catalyst. The ratios of the metal/charcoal components comprising the catalysts are shown in column 4, and the total amount of the mixed metal on charcoal catalyst is shown in column 5. Since the catalysts in Examples 23 to 27 are single metal catalysts, the percentages in columns 3 and 5 are the same. In column 6 is given the amount of aldehyde employed in a particular example. It is expressed in mole percent of aldehyde based on the number of moles of olefin that is being isomerized.

TABLE 2

| Ex. No. | Olefin | Catalyst Composition Wt. Percent $M_1$/C: Wt. Percent $M_2$/C and aldehyde | Ratio of $Metal_1$: $Metal_2$ | Weight Percent Catalyst | Mole Percent Aldehyde | Temp., °C | Time, hr. | Product |
|---|---|---|---|---|---|---|---|---|
| 3 | Dodecene-1 | 0.5% Ru/C:5% Pd/C—n-nonaldehyde | 1:10 | 5.5 | 5.0 | 180 | 0.5 | Dodecene-2. |
| 4 | do | 1% Ru/C:5% Pd/C—n-heptaldehyde | 1:5 | 6 | 3.0 | 150 | 1 | Do. |
| 5 | do | 5% Ru/C:5% Pd/C—n-heptaldehyde | 1:1 | 10 | 1.0 | 125 | 1 | Do. |
| 6 | do | 1% Ru/C:7.5% Pd/C—isoheptaldehyde | 1:7.5 | 8.5 | 1.0 | 150 | 2 | Do. |
| 7 | do | 1% Rh/C:9% Pd/C—isononaldehyde | 1:9 | 10 | 1.0 | 150 | 0.25 | Do. |
| 8 | do | 2.5% Rh/C:2.5% Ru/C—n-caproic aldehyde | 1:1 | 5 | 3.0 | 175 | 1 | Do. |
| 9 | do | 0.5% Rh/C:0.5% Ru/C—n-capric aldehyde | 1:1 | 1 | 5.0 | Reflux | 1.5 | Do. |
| 10 | do | 2% Rh/C:8% Pt/C—n-caprylic aldehyde | 1:4 | 10 | 1.0 | Reflux | 2 | Do. |
| 11 | do | 3% Ru/C:7% Pt/C—acetaldehyde | 3:7 | 10 | 1.0 | Reflux | 1 | Do. |
| 12 | do | 5% Ru/C:5% Pt/C—n-butyraldehyde | 1:1 | 10 | 1.0 | 175 | 0.5 | Do. |
| 13 | do | 0.5% Rh/C:0.5% Ru/C:9% Pd/C—n-heptaldehyde | | 10 | 1.0 | 150 | 0.25 | Do. |
| 14 | Tetradecene-1 | 7.5% Ru/C:2.5% Rh/C—isovaleraldehyde | 3:1 | 10 | 2.0 | 100 | 0.5 | Tetradecene-2 |
| 15 | Hexadecene-1 | 7.5% Ru/C:2.5% Rh/C—isobutyraldehyde | 3:1 | 10 | 3.0 | 175 | 0.5 | Hexadecene-2. |

TABLE 2—Continued

| Ex. No. | Olefin | Catalyst Composition Wt. Percent M₁/C: Wt. Percent M₂/C and aldehyde | Ratio of Metal₁: Metal₂ | Weight Percent Catalyst | Mole Percent Aldehyde | Temp., °C | Time, hr. | Product |
|---|---|---|---|---|---|---|---|---|
| 16 | Hexene-1 | 0.1% Ru/C:10% Rh/C—isobutyraldehyde | 1:100 | 10.1 | 2.0 | 63 | 1 | Hexene-2 |
| 17 | Tetraeicosene-1 | 3% Rh/C:7% Pd/C—benzaldehyde | 3:7 | 10 | 1.0 | 250 | 2.5 | Tetraeicosene-2 |
| 18 | Eicosene-1 | 5% Rh/C:5% Pd/C—ethoxyacetaldehyde | 1:1 | 10 | 1.0 | 275 | 0.5 | Eicosene-2 |
| 19 | Octadecene-1 | 5% Rh/C:5% Pd/C—4-hydroxybenzaldehyde | 1:1 | 10 | 1.0 | 225 | 0.75 | Octadecene-2 |
| 20 | Decene-1 | 5% Rh/C:5% Ru/C—3-hydroxybutyraldehyde | 1:1 | 10 | 1.0 | 125 | 0.5 | Decene-2 |
| 21 | 5-methyl-dodecene-1 | 1% Ru/C:5% Pd/C—chloral | 1:5 | 6 | 3.0 | 150 | 0.25 | 5-methyl-dodecene-2 |
| 22 | 2-methyl-dodecene-1 | 5% Ru/C:5% Pd/C—2-ethylvaleraldehyde | 1:1 | 10 | 1.0 | 125 | 0.25 | 2-methyl-dodecene-2 |
| 23 | Dodecene-1 | 10% Ru/C—n-heptaldehyde | | 10 | 5.0 | 125 | 0.25 | Dodecene-2 |
| 24 | ...do... | 5% Ru/C—n-capric aldehyde | | 5 | 5.0 | 150 | 0.5 | Do. |
| 25 | ...do... | 5% Rh/C—n-heptaldehyde | | 5 | 7.5 | 150 | 0.25 | Do. |
| 26 | Decene-1 | 10% Pt/C—n-heptaldehyde | | 10 | 5.0 | 175 | 0.5 | Decene-2 |
| 27 | ...do... | 10% Pt/C—n-caproic aldehyde | | 10 | 5.0 | 175 | 0.75 | Do. |

Examples 1, 2, 6, 9, 10, 13, 17, 23, 25 and 26 are repeated following the same procedure except that the metal content of the catalyst was changed from 5% metal on charcoal to 0.1%, 1%, 10%, 15%, and 20% of a metal or metal mixture on charcoal. Results comparable to those in Table 2 were obtained.

The internal olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other internal olefins produced by this process can be ozonized to yield the corresponding acids. When ozonizing the products of the process of this invention, the reaction is generally carried out at a low temperature; e.g., from −50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the process of this invention, the products produced thereby and their many utilities, it is desired that this invention be limited only by the lawful scope of the appended claims.

We claim:

1. A process for the isomerization of an olefin which comprises contacting said olefin with (a) a catalytic quantity of a catalyst consisting substantially of charcoal having dispersed thereon a Group VIII metal of the second and third long periods of the Periodic Table and (b) a promoter quantity of a paraffinic aldehyde having from 2 to about 12 carbon atoms, and being solely composed of carbon, hydrogen and oxygen.

2. The process of claim 1 wherein said aldehyde is an acyclic paraffinic aldehyde.

3. The process of claim 2 wherein said aldehyde is an unbranched acyclic paraffinic aldehyde.

4. The process of claim 3 wherein said unbranched acyclic paraffinic aldehyde has 6 to 10 carbon atoms.

5. The process of claim 4 wherein said aldehyde is n-heptanal.

6. A process for isomerizing a straight-chain terminal olefin having from 4 to about 24 carbon atoms to a straight-chain internal olefin, said process comprising contacting said terminal olefin at a temperature of from about 20° C. to the decomposition temperature of said terminal olefin, with (a) a catalytic quantity of a catalyst consisting substantially of a Group VIII metal selected from the group consisting of palladium, platinum, rhodium, iridium, ruthenium, and metal mixtures of ruthenium-platinum, ruthenium-palladium, rhodium-palladium, rhodium-ruthenium, and rhodium-ruthenium-palladium, said metal being dispersed on charcoal, and (b) a promoter quantity of acyclic paraffinic aldehyde having from 2 to about 10 carbon atoms, said aldehyde being composed solely of carbon, hydrogen and oxygen.

7. The process of claim 6 wherein said temperature is between 125° C. and 225° C.

8. A process for isomerizing a straight-chain terminal olefin having from 12 to about 24 carbon atoms to a straight-chain β-olefin, said process comprising contacting said terminal olefin with a catalytic quantity of an isomerization catalyst, said catalyst consisting essentially of (a) a Group VIII metal selected from the group consisting of palladium, platinum, rhodium, iridium, ruthenium, and metal mixtures of ruthenium-platinum, ruthenium-palladium, rhodium-palladium, rhodium-ruthenium, and rhodium-ruthenium-palladium, said metal being dispersed on a finely divided charcoal such that the metal content of said catalyst is from 0.1 to about 20 weight percent, and in the case of metal mixtures, such that the ratio of one metal to another is within the range of from 100:1 to 1:100, and (b) a promoter quantity of acyclic paraffinic aldehyde having from 2 to about 10 carbon atoms, said aldehyde being composed solely of carbon, hydrogen and oxygen; said process being carried out at a temperature of from about 100 to about 300° C.

9. A process for the conversion of a straight-chain terminal olefin selected from the group consisting of dodecene-1, tetradecene-1, and hexadecene-1 to a straight-chain β-olefin, said process comprising contacting said terminal olefin with a catalytic quantity of an isomerization catalyst, said catalyst consisting substantially of (a) from about 1 to about 15 weight percent of a Group VIII metal selected from the group consisting of palladium, platinum, rhodium, iridium, ruthenium, and metal mixtures of ruthenium-platinum, ruthenium-palladium, rhodium-palladium, and rhodium-ruthenium wherein the ratio of one metal to the other is within the range of 10:1 to 1:10, and rhodium-ruthenium-palladium wherein each metal constitutes at least 5 percent of the total metal content, said metal being dispersed on a finely divided charcoal, and (b) a promoter quantity of an acyclic paraffinc aldehyde having from 2 to about 10 carbon atoms, said aldehyde being composed solely of carbon, hydrogen and oxygen; said process being carried out at a temperature of from about 150 to about 275° C.

10. A process for the preparation of dodecene-2 from dodecene-1, said process comprising contacting dodecene-1 with about 10 weight percent of an isomerization catalyst consisting substantially of (a) about 5 weight percent of Group VIII metal selected from the group consisting of palladium, platinum, rhodium, iridium, ruthenium, and metal mixtures of ruthenium-platinum, rutheneum-palladium, rhodium-palladium, rhodium-ruthenium, wherein the ratio of one metal to another is within the range of 10:1 to 1:10, and rhodium-ruthenium-palladium wherein each metal constitutes at least 5 percent of the total metal content; said metal being dispersed on about 95 weight percent of a finely divided activated charcoal, and (b) a promoter quantity of n-heptanal, said process being carried out at atmospheric pressure in an inert atmosphere and at a temperature within the range of from 150° C. to the reflux temperature of the system.

11. A process for the preparation of dodecene-2 from dodecene-1, said process comprising contacting dodecene-1 with about 10 weight percent of an isomeriztaion catalyst consisting essentially of (a) about 5 weight percent of palladium dispersed on 95 weight percent of finely divided activated charcoal, and (b) a promoter quantity of n-heptanal; said process being carried out at atmospheric pressure in an inert atmosphere and at a temperature within the range of from 150° C. to the reflux temperature of the system.

12. A process for the preparation of dodecene-2 from dodecene-1, said process comprising contacting dodecene-1 with about 10 weight percent of an isomerization catalyst consisting essentially of (a) about 5 weight percent of ruthenium-palladium mixture, said mixture consisting substantially of one part ruthenium and 9 parts palladium dispersed on 95 weight percent of a finely divided activated charcoal, and (b) a promoter quantity of n-heptanal; said process being carried out at atmospheric pressure in an inert atmosphere and at a temperature within the range of from 150° C. to the reflux temperature of the system.

13. The process of claim 6 wherein said acyclic, paraffinic aldehyde has from 6 to about 10 carbon atoms.

14. The process of claim 13 wherein said temperature is between 125° C. and 225° C.

15. The process of claim 8 wherein said acyclic paraffinic aldehyde has from 6 to about 10 carbon atoms.

16. The process of claim 9 wherein said acyclic paraffinic aldehyde has from 6 to about 10 carbon atoms.

References Cited

UNITED STATES PATENTS

| | | | |
|---|---|---|---|
| 2,591,367 | 4/1952 | McAllister | 260—683.2 X |
| 2,960,550 | 11/1960 | Feller et al. | 260—683.2 |
| 2,988,578 | 6/1961 | Fleck et al. | 260—683.2 |
| 3,205,282 | 9/1965 | Sparke et al. | 260—683.2 |
| 3,248,448 | 4/1966 | Goble et al. | 260—683.2 |

OTHER REFERENCES

Harrod et al.: "Double Bond Migration in n-Olefins Catalyzed by Group VIII Metal Complexes," Journal of the American Chemical Society, vol. 86, pp. 1776–79, 1964.

DELBERT E. GANTZ, *Primary Examiner.*

R. A. SHUBERT, V. O'KEEFE, *Assistant Examiners.*